(12) United States Patent
Silvester

(10) Patent No.: US 6,812,958 B1
(45) Date of Patent: Nov. 2, 2004

(54) STORABLE DIGITAL CAMERA ASSOCIATED WITH A COMPUTER SYSTEM

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/150,590

(22) Filed: Sep. 10, 1998

(51) Int. Cl.[7] ............................................... H04N 5/225
(52) U.S. Cl. ..................... 348/207.1; 348/375; 348/552
(58) Field of Search ................................ 348/207, 552, 348/373, 374, 375, 376, 14.01, 14.02, 14.07, 14.08, 207.99, 207.1, 207.11; 358/471, 906, 909.1; 361/683, 681, 684, 685, 686, 737; 364/705.01, 708.01; 395/893; H04N 5/225

(56) References Cited

U.S. PATENT DOCUMENTS

| | | | | |
|---|---|---|---|---|
| 4,340,287 A | * | 7/1982 | Yamamoto | .................. 396/176 |
| 5,475,441 A | * | 12/1995 | Parulski et al. | ............. 348/552 |
| 5,708,853 A | * | 1/1998 | Sanemitsu | .................... 710/73 |
| 5,768,163 A | * | 6/1998 | Smith, II | .................... 708/105 |
| 5,801,919 A | * | 9/1998 | Griencewic | ................. 361/683 |
| 5,867,218 A | * | 2/1999 | Matsuzaki et al. | .......... 348/373 |
| 6,141,052 A | * | 10/2000 | Fukumitsu | ................... 348/37 |
| 6,256,060 B1 | * | 7/2001 | Wakui | ................... 348/207.11 |
| 6,292,272 B1 | * | 9/2001 | Okauchi et al. | ............ 358/471 |

* cited by examiner

*Primary Examiner*—Tuan Ho
(74) *Attorney, Agent, or Firm*—Trop, Pruner & Hu, P.C.

(57) ABSTRACT

A digital camera may include a portion that is translatable into and out of a computer system housing. The camera portion may be mounted such that when pushed inwardly into the housing from a stored position, the camera portion automatically springs outwardly from the housing and is ready for use. The camera may be operated "on" by the act of causing the camera portion to spring to its outwardly oriented position. Once outside of the computer housing, the camera portion may be rotated to adjust the direction of focus of the camera.

35 Claims, 9 Drawing Sheets

STORABLE DIGITAL CAMERA ASSOCIATED WITH A COMPUTER SYSTEM

BACKGROUND

This invention relates generally to computer systems and to digital cameras and particularly to computer systems and other devices with digital cameras.

Digital cameras are useful with personal computer systems and other computer systems. Streaming video may be electronically captured on the computer system or displayed on a display associated with the computer system without the need for film processing. In addition, the resulting images can be manipulated using hardware or software associated with the camera and/or the computer system to create special effects. Also, images may be stored in computer memory or transmitted using available computer transmission methods including modem and Internet communications.

Digital cameras have been associated with computer systems in part because of the small size of the digital camera. Digital cameras can be made using charge coupled device (CCD) imaging arrays. They can also be made using conventional complementary metal oxide semiconductor (CMOS) technology so that they may be integrated with other logic components.

Currently, cameras may use a cable tether to connect the camera to the computer system. The computer system acts as a host processor to provide advanced processing capabilities and additional peripheral components to augment the camera's capabilities. While these combinations have many advantages, they tend to be cumbersome and, in connection with a portable computer, may be unwieldy for many users.

Thus, there is a continuing need for a better way integrate the digital camera into portable computers, desk top computers, and computer components.

SUMMARY

In accordance with one embodiment, a computer system includes at least one housed component. A digital camera includes a portion mounted for movement into and out of the component from a first position substantially concealed within the component and a second position extending out of the component.

DETAILED DESCRIPTION

Figure 1:
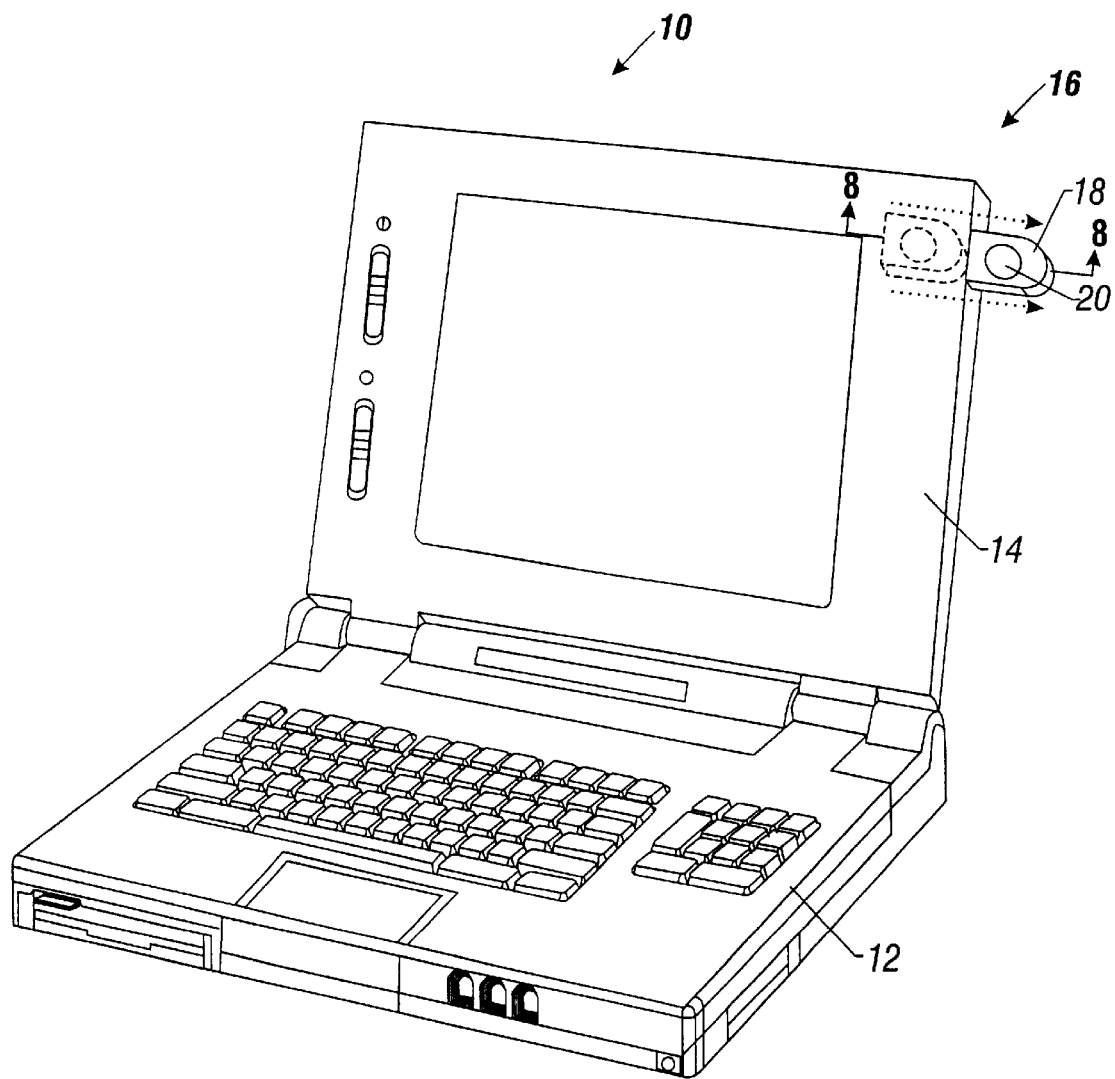
FIG. 1 is a perspective view of one embodiment of the present invention incorporated into a portable computer.

A portable computer 10, shown in FIG. 1, may include a keyboard housing 12 and a display housing 14 which may be hingedly connected. A digital camera 16 is mountable within a housing of the computer 10 for translation into and out of the housing. The camera 16 may reciprocate in the illustrated embodiment from a first position (shown in dashed lines), concealed within the housing 14, for example, to a second position extending outwardly from said housing 14 for taking digital still or movie pictures.

The camera 16 may include a translating component 18 having a camera lens 20 mounted thereon. The electronics for implementing the digital camera may be movable with the component 18 or they may be retained inside either the housing 12 or 14, communicating electrically with the lens 20 and associated imaging array. For example, an image processor may be located in proximity to the processor of the computer 10. A cable may extend from the housing 12 to the lens 20 to communicate with an imaging array associated with the lens 20. Multiple cameras may be mounted in a single computer system 10.

The component 18 is advantageously mounted so that it extends substantially completely within the housing 12 or 14 and releasably locks therein. When actuated inwardly from this position, the component 18 springs outwardly to its fully extended position, shown in solid lines in FIG. 1. When pushed back into the housing (but not over extended into the housing), the component 18 again locks in its concealed position within the housing.

Figure 8:
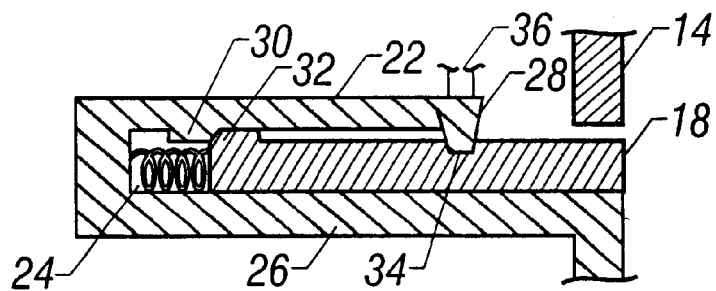
FIG. 8 is a partial, enlarged cross-sectional view taken generally along the line 8—8 in FIG. 1.

A variety of known techniques are available for implementing this type of push-button operation. One exemplary embodiment, shown in FIG. 8, includes a catch 28 mounted on a cantilevered spring arm 22. When the component 18 is fully extended into the housing 14, the catch 28 engages a groove 34 in the component 18.

Figure 9:
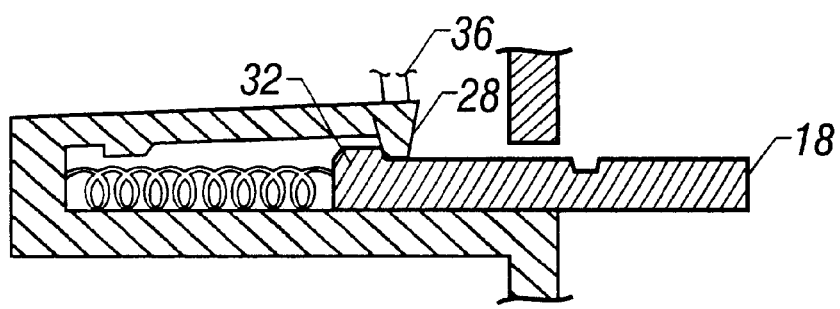
FIG. 9 is a partial, enlarged cross-sectional view corresponding to FIG. 8 when the camera has been extended outwardly.

When the component 18 is extended further into the housing 14, a cam 32 engages a cam 30 on the arm 22, disengaging the catch 28 from the groove 34. In this position, a coiled spring 24 is tightly coiled, so that once the catch 28 is disengaged, the component 18 is forcefully ejected from the housing 14. Because the cam 32 presses upwardly on the arm 22, by the time the spring arm 22 springs back to the position shown in FIG. 8, the component 18 has already gone past the catch 28 and has assumed the position shown in FIG. 9. In FIG. 9, the component 18 is spring biased to the outwardly extending position so that when the component 18 is returned into its housing, the spring 24 is compressed.

In the position shown in FIG. 9, an electrical contact may be made, for example, between the arm 32 and the catch 28 which contact completes an electrical circuit including the wires 36. In this way, the outward operation of the camera 16 can also provide power to the camera 16. As a result, the camera 16 may be powered only when it is ready for use; that is, in one operation, the camera may be both extended and turned on.

Figure 2:
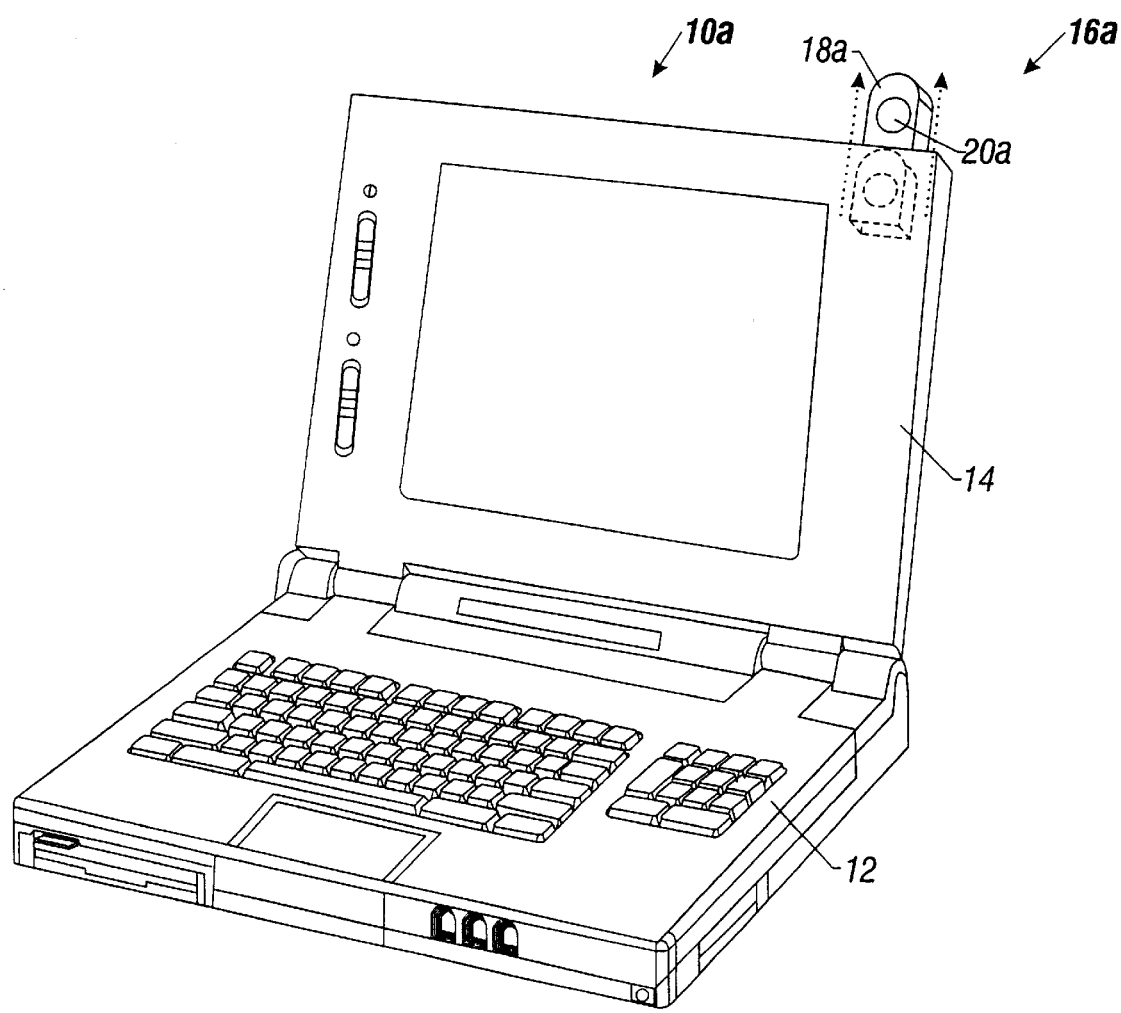
FIG. 2 is a perspective view of another embodiment of the present invention incorporated into a portable computer.

Referring next to FIG. 2, another orientation of a digital camera with respect to a portable computer is illustrated. In this case, the portable computer 10a has a camera 16a which translates into and out of the upper edge of the display housing 14 in a direction transverse to that utilized in connection with the camera 16. The camera lens 20 is then oriented at a higher position on the housing 14 when the component 18a is extended outwardly.

Figure 3:
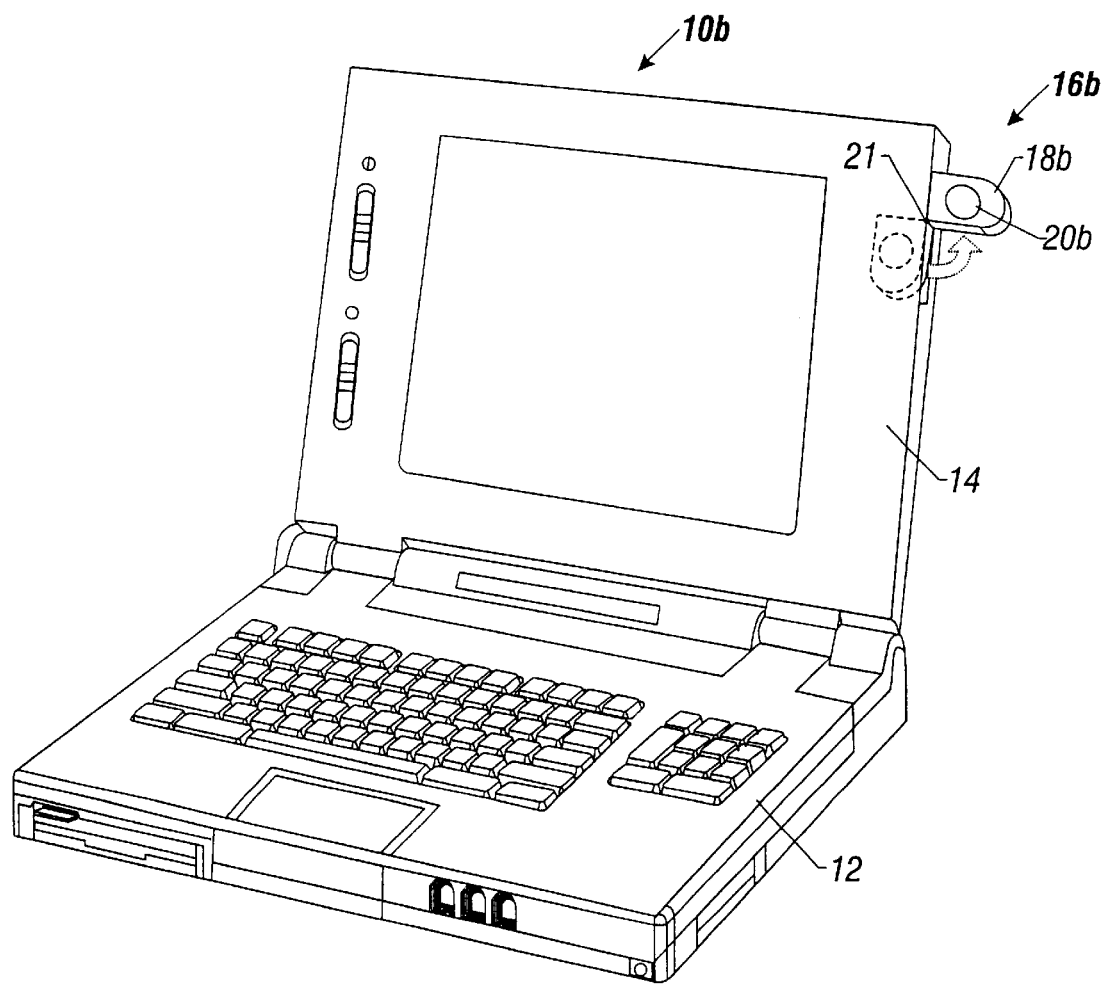
FIG. 3 is a perspective view of still another embodiment of the present invention incorporated into a portable computer

FIG. 3 shows still another embodiment of a camera 16b in a portable computer 10b. Instead of reciprocating, the component 18b rotates out of the housing 14 through an arc of about 90° in the illustrated embodiment. That is, the camera rotates from the dashed line position shown inside the housing 14 to the solid line position shown extending outwardly of the housing 14. The mechanism for locking and extending the camera may be substantially as described previously except that instead of spring biasing the camera for reciprocation, the spring simply rotates the camera around a hinge 21.

Figure 4:
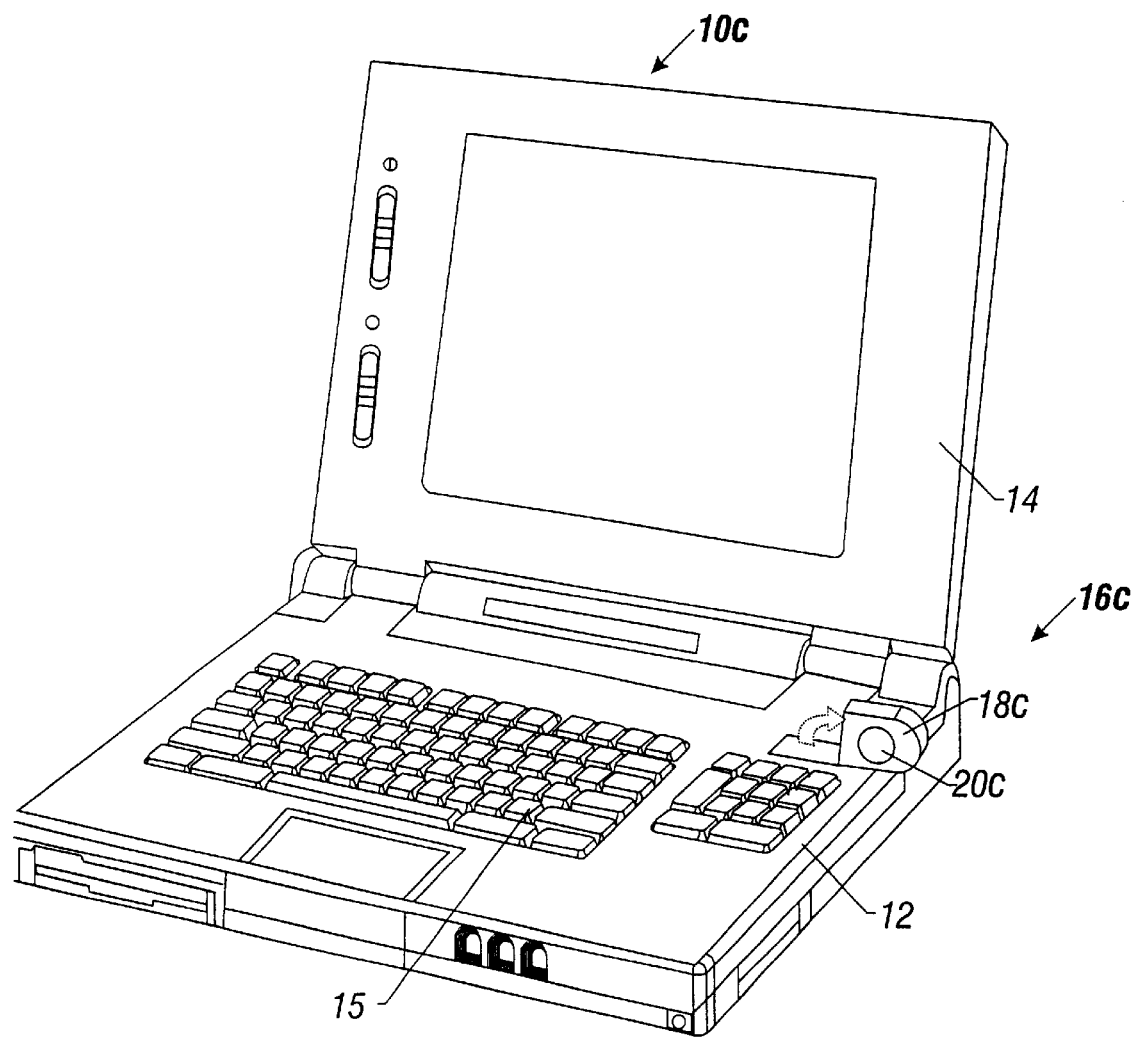
FIG. 4 is a perspective view of another embodiment of the present invention incorporated into a portable computer.

Turning next to FIG. 4, a camera may be mounted for rotation out of the housing 12 from a first vertical orientation transverse to the keyboard 15 to a second vertical orientation sitting up on the keyboard housing 12 and rotated 180° from its stored position. In this orientation, the camera 16c is out of the way of the display 14. The camera 16c may overlap the computer housing 12 to some degree and extend outwardly to the side of the housings 12 and 14.

Figure 5:
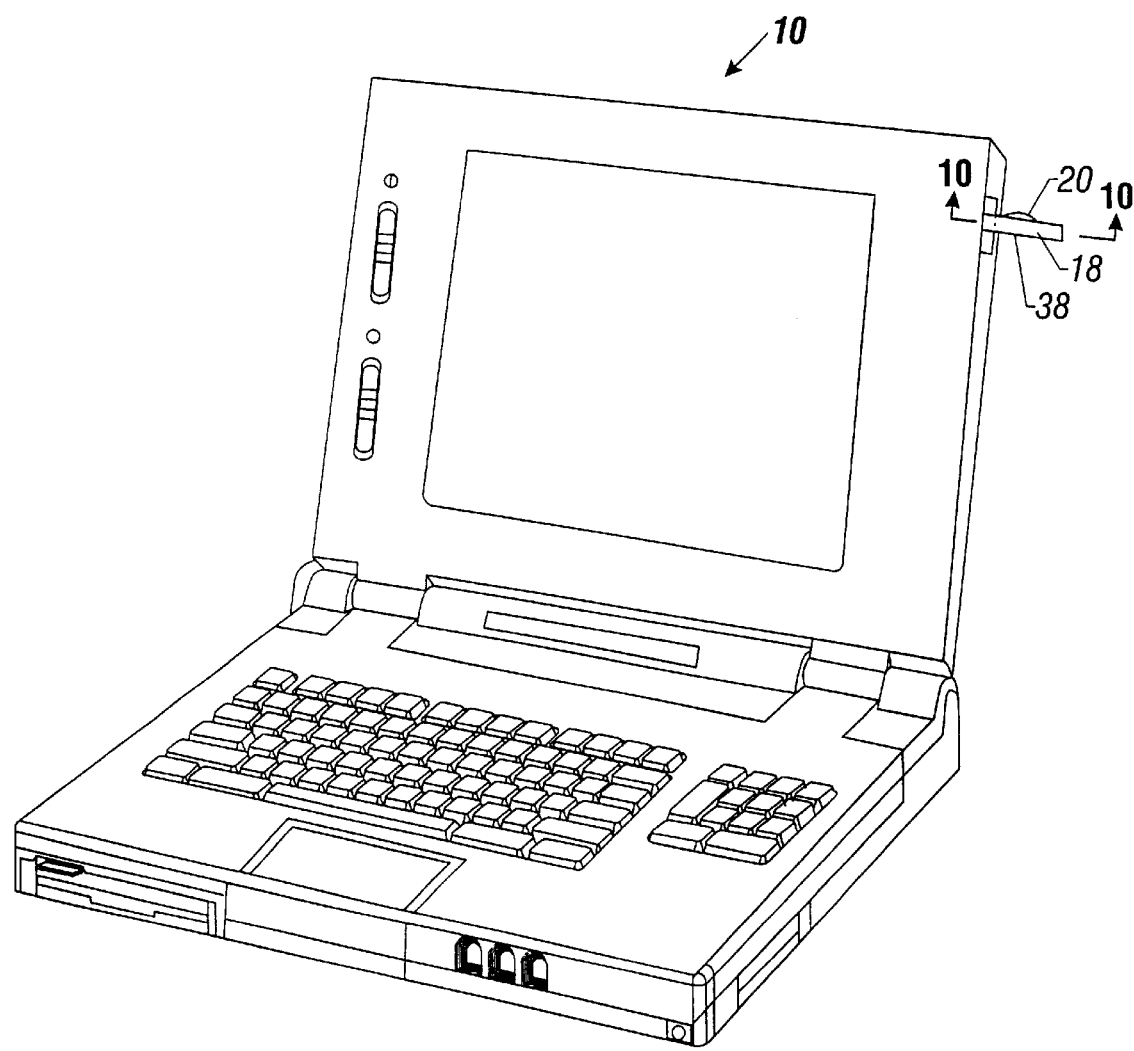
FIG. 5 is a perspective view of the embodiment of FIG. 1 showing the digital camera in a rotated orientation.
Figure 6:
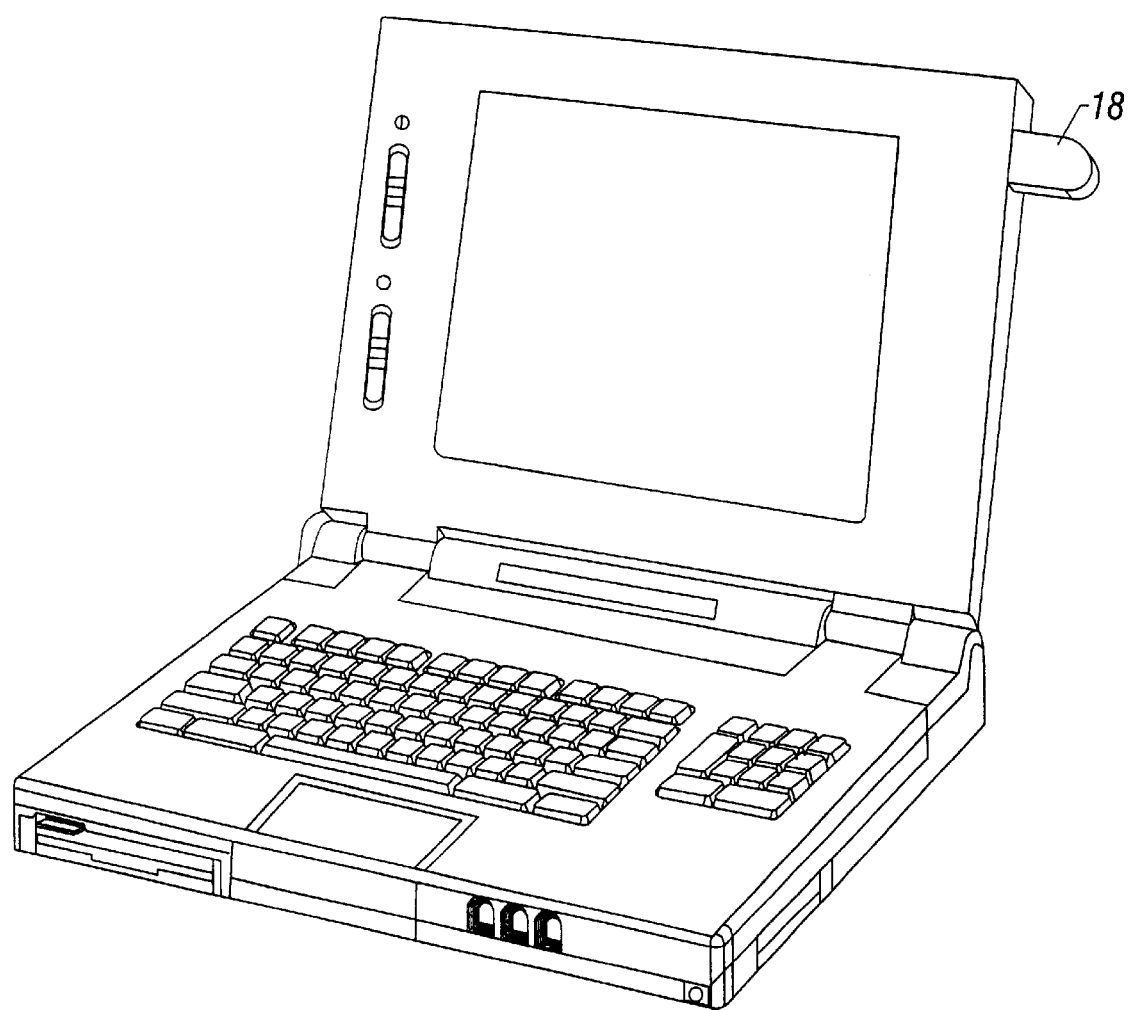
FIG. 6 is a perspective view corresponding to FIG. 5 with the camera rotated to still another position.

As shown in FIGS. 5 and 6, an outward portion 38 of in the component 18 may rotate around an axis extending generally parallel to the length of the component 18 so that the lens 20 may be oriented in a desired way to record an image. Thus, in FIG. 5, the lens 20 is shown pointing straight upwardly, and in FIG. 6, the lens 20 is shown facing oppositely from the orientation shown in FIG. 1.

Figure 10:
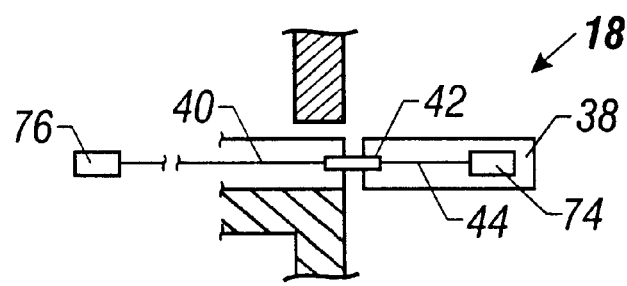
FIG. 10 is an enlarged cross-sectional view taken generally along the line 10—10 in FIG. 5.

Referring now to FIG. 10, the component 18 may include a pair of hingedly connected portions 38 and 40 connected by a rotatable tube 42. The tube allows relative rotation between the portions 38 and 40. Electrical continuity may be maintained by extending a conductor 44 through the interior of the tube 42. The conductor 44 may couple the imaging array 74 to the image processor 76 inside a housing 12 or 14.

If desired, the portion 38 may be detachable from the rest of the component 18. This may be achieved by sliding the portion 38 off of the tube 42 and allowing the connecting wire 44 to feed out of the remainder of the housing so that the lens 20 may be placed at a location remote from the rest of the computer 10. In addition, the portion 38 may be provided with an wireless link to a receiver within the computer system 10 so that once detached, the portion 38 may communicate, for example, by infrared or radio frequency signals to convey information back to the computer 10.

Figure 7:
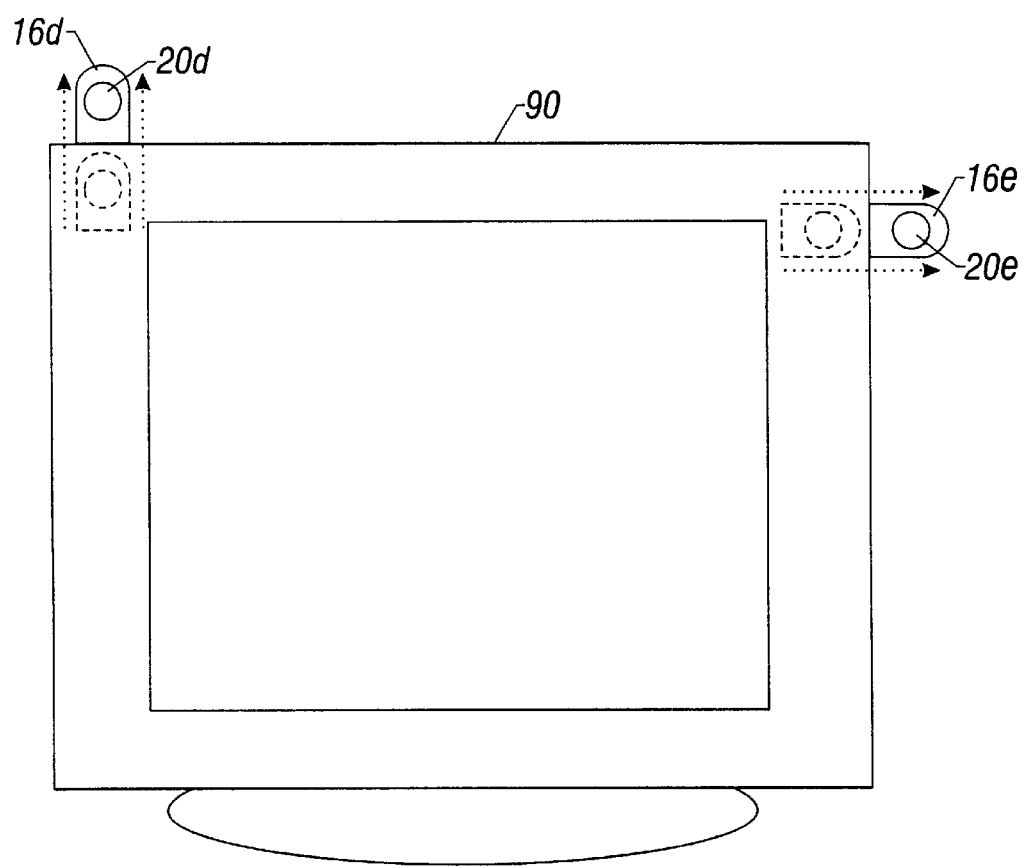
FIG. 7 is a front elevational view of a display screen for a computer system having a pair of digital cameras incorporated therein.

Turning now to FIG. 7, a computer component 90 is adapted to include a pair of cameras 16d and 16e. In the illustrated embodiment, the component 90 is a desk top computer monitor. The cameras 16d and 16e are mounted for a reciprocation into and out of the housing of the component 90 so as to extend either above or to the side of the component. In addition, any of the cameras 16b or 16c could be used in conjunction with the component 90. Associating the camera with the display screen may be especially advantageous in embodiments using video conferencing.

Figure 11:
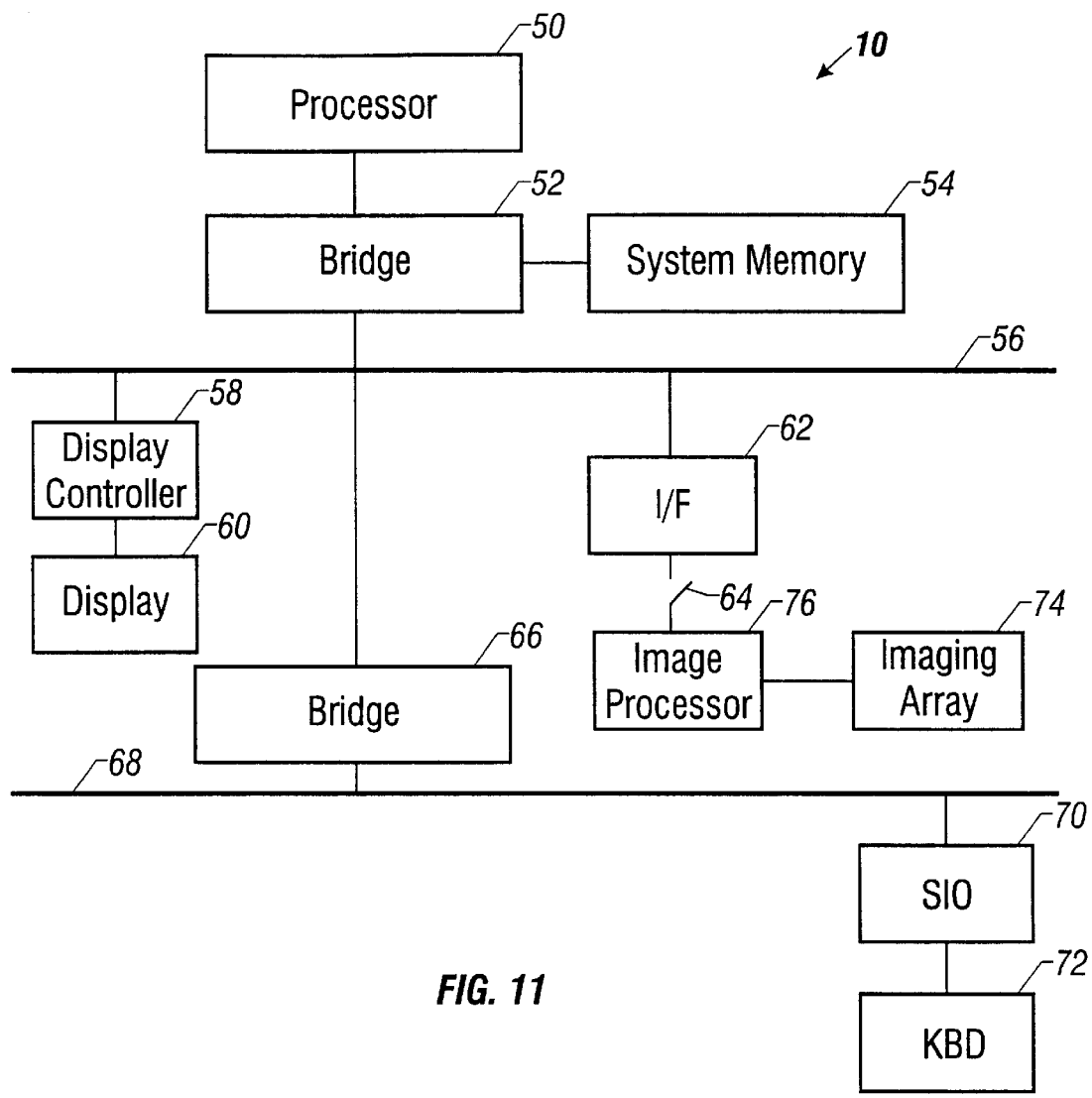
FIG. 11 is a block diagram depiction of the computer system shown in FIG. 1.

As shown in FIG. 11, the computer system 10 may include a processor 50 coupled to a bridge 52, in turn coupled to a system memory 54. The bridge 52 may connect a bus 56 such as a Peripheral Component Interconnect (PCI) bus. The bus 56 couples a display controller 58 and a display 60. The display 60 could be any one of the displays illustrated in FIGS. 1 through 7.

An interface 62 may also be coupled to the bus 56 and through the switch 64 to an image processor 76. The image processor 76 may operate with an imaging array 74 contained, for example, in the component 18. As mentioned earlier, an image processor 76 may be contained within the housing of the computer 10 or may be provided in the component 18. The switch 64, which may be implemented as illustrated in FIG. 9, may be automatically closed when the component 18 is operated to extend out of the computer system housing.

The bus 56 may also be coupled to a bridge 66 which is, in turn, coupled to another bus 68. The bus 68 may support a serial input/output interface (SIO) 70 which may be coupled, for example, to the keyboard 72.

Figure 12:
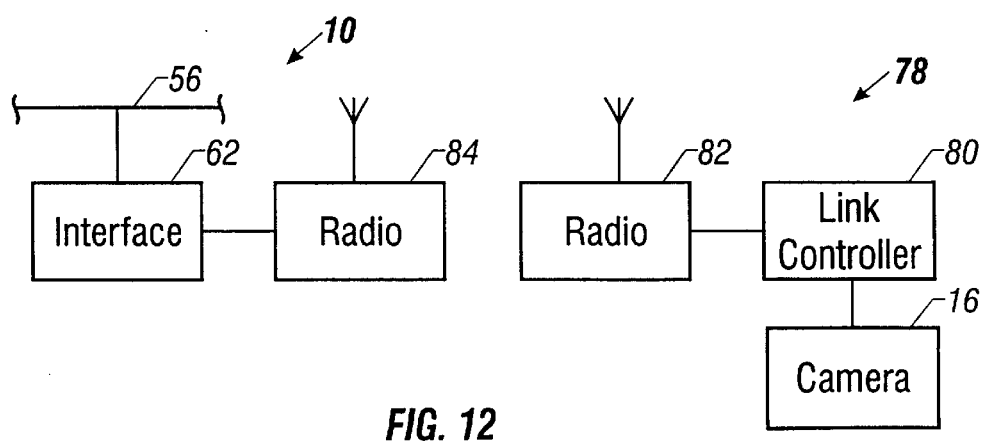
FIG. 12 is a block depiction of a radio frequency link between a camera and a computer system.

Referring now to FIG. 12, a radio link 78 may connect the computer system 10 to the camera 16, for example, when the camera 16 is detached from the computer system 10. The radio link continues to transmit data back to the computer system 10 through the radio link 78. The camera 16 may be coupled to a radio 82 by a link controller 80. The radio 82 transmits a radio frequency signal to a radio 84 connected to the bus 56 by an interface 62.

A variety of conventional radio links may be utilized. One particularly advantageous radio link is the Bluetooth radio link (see www.bluetooth.com) which uses a short-range, cable replacement, radio technology. The Bluetooth radio link uses the 2.4 GHz Instrumentation, Science, Medical (ISM) unlicensed band. The radios 82, 84 may be set to a nominal range of 10 meters, augmentable with an external power amplifier to up to 100 meters. Seventy-nine hop frequencies are utilized beginning at the lowest frequency, which is 2402 MHz, and each of the other hop frequencies is 1 MHz above the next lower frequency.

A connection may be made between the two radios 82, 84 by sending a page message. A page message may include a train of 16 identical page messages on 16 different hop frequencies. The system may use a Synchronous Connection Oriented (SCO) link for point-to-point, full duplex links, normally used in voice communication. For the application described herein, the Asynchronous Connectionless Link (ACL) may be used.

ACL provides one frame duration links with full duplex communications. ACL uses a time division duplex scheme. A first slot provides a transmission from the master to the slave and a second slot provides a transmission from the slave to the master. Each slot is transmitted on a different hop frequency. The device initializing the transmission is designated the master and the device receiving the transmission is designated the slave.

The link controller 80 includes the hardware for performing the baseband processing and the basic protocols close to the physical layer such as the error correction coding and the automatic repeat request (ARQ). ARQ provides an acknowledgement to the master, in response to a transmission in one slot, in the next following slot which is transmitted from the slave to the master and vice versa. The Bluetooth system uses GFSK modulation and a BT-product of 0.5. The data and symbol rate is 1 Ms/s at the air interface.

While the present invention has been described with respect to a limited number of embodiments, those skilled in the art will appreciate numerous modifications and variations. It is intended that the appended claims cover all such modifications and variations as fall within the true spirit and scope of the present invention.

What is claimed is:

1. A computer system comprising:
    at least one housed component; and
    a digital camera including a portion to move into and out of said component, and an attachment element, said attachment element connected to said housed component by a connector, and said portion detachably connected to said attachment element by a rotatable tube.

2. The system of claim 1, wherein said camera is automatically turned on when the portion extends out of said component.

3. The system of claim 1 wherein said camera includes an imaging array and an image processor, said imaging array mounted for movement into and out of said component, and said image processor mounted within the component.

4. The system of claim 3, wherein a conductor extends through the interior of said tube to couple said imaging array and said image processor.

5. The system of claim 1, wherein said portion automatically extends out of said component when said portion is in said component and is pushed further inwardly into said component.

6. The system of claim 1, wherein said portion is spring biased out of said component.

7. The system of claim 1, wherein said portion reciprocates into and out of said component.

8. The system of claim 1, wherein said portion rotates into and out of said component.

9. The system of claim 1, wherein said portion translates into and out of said component, and rotates relative to said component when extending out of said component.

10. The system of claim 1, wherein said system includes a display and said portion is mounted on said display.

11. The system of claim 1, wherein said camera may be removed from said housing.

12. The system of claim 1, wherein movement of said portion for movement is between a first position substantially concealed within the component and a second position extending out of said component.

13. The system of claim 1, wherein said camera communicates with said computer system through free space.

14. The system of claim 1, wherein said portion for movement and said attachment element are hingedly connected.

15. The system of claim 1, wherein said portion for movement and said attachment element are connected by an extendable connection wire.

16. A digital camera mountable within the housing of an electrical component comprising:
    a camera element; and
    a mounting element connected to said camera element by a rotatable tube, said mounting element having a connector to connect said mounting element to said housing such that said camera element can move between a first position substantially concealed within the fit housing and a second position extending out of said housing.

17. The camera of claim 16 including a switch which turns the camera on when the camera element is extended to said second position.

18. The camera of claim 16, wherein said camera element automatically extends out of said housing when said camera element is in said housing and is pushed further inwardly into said housing.

19. The camera of claim 16, wherein said camera element reciprocates into and out of said housing.

20. The camera of claims 16, wherein said camera element rotates into and out of said housing.

21. The camera of claim 16, wherein said camera element translates into and out of said housing, and rotates relative to said housing when extending out of said housing.

22. The camera of claim 16 wherein said component is a computer.

23. The camera of claim 16 including a wireless link to enable communication with said component through free space.

24. The camera of claim 16 wherein said camera element and said mounting element are hingedly connected.

25. The camera of claim 16 wherein said camera element and said mounting element are connected by an extendable connection wire.

26. A device comprising:
    a housed electrical component; and
    a camera mounted to said component to move into and out of said housed electrical component, between a first position substantially concealed within the component and a second position extending out of the component, said camera including a first portion detachably connected to a second portion by a rotatable tube.

27. The device of claim 26 wherein said camera includes an imaging array and an imaging processor, said imaging array mounted for movement into and out of said housed electrical component, and said image processor mounted within said housed electrical component.

28. The device of claim 27 wherein said housed electrical component is a computer and said image processor is proximate the processor of the computer.

29. The device of claim 27 including a conductor which extends through the interior of said tube to couple said imaging array and said image processor.

30. The device of claim 26 further including an additional camera mounted for movement into and out of said housed electrical component, from a first position substantially concealed within the component and a second position extending out of the component.

31. The device of claim 26, wherein said first portion includes a lens.

32. The device of claim 26, wherein said camera communicates with said housed electrical component through a wireless link.

33. The device of claim 26 wherein said camera is automatically turned on when said camera transitions to said second position.

34. The device of claim 26 wherein said first portion and said second portion are connected by an extendable connection wire.

35. The device of claim 26 wherein a connector connects said second portion to said housing.

* * * * *

UNITED STATES PATENT AND TRADEMARK OFFICE
CERTIFICATE OF CORRECTION

PATENT NO. : 6,812,958 B1 Page 1 of 1
DATED : November 2, 2004
INVENTOR(S) : Kelan C. Silvester It is certified that error appears in the above-identified patent and that said Letters Patent is hereby corrected as shown below:

Column 5,
Line 56, "fit" should be deleted.

Signed and Sealed this

Fifteenth Day of February, 2005

JON W. DUDAS
*Director of the United States Patent and Trademark Office*